United States Patent [19]

Ito et al.

[11] 4,297,034
[45] Oct. 27, 1981

[54] APPARATUS FOR MEASURING CONTOUR CONFIGURATION OF ARTICLES

[75] Inventors: Isao Ito, Nagoya; Seiichi Tunashima, Kasugai, both of Japan

[73] Assignee: NGK Insulators, Ltd., Nagoya, Japan

[21] Appl. No.: 48,735

[22] Filed: Jun. 15, 1979

[30] Foreign Application Priority Data

Sep. 11, 1978 [JP] Japan ................................ 53-110599

[51] Int. Cl.³ ........................ G01B 11/24; G01B 11/00
[52] U.S. Cl. .................................... 356/394; 356/376; 356/398
[58] Field of Search ................................ 356/375–376, 356/385–387, 394, 398, 428; 250/224, 560

[56] References Cited

U.S. PATENT DOCUMENTS

| 3,216,311 | 11/1965 | Bibbero | 356/394 |
| 3,715,165 | 2/1973 | Smith | 356/376 |
| 4,064,534 | 12/1977 | Chen et al. | 250/560 |
| 4,122,525 | 10/1978 | Eaton | 356/387 |

FOREIGN PATENT DOCUMENTS 1361601   7/1974   United Kingdom ................ 356/398

OTHER PUBLICATIONS

Reich et al., "High-Speed Profile Measurement with Electro-Optics", Optical Engineering, vol. 15, 1,2-76, pp. 44–47.

Primary Examiner—William H. Punter
Attorney, Agent, or Firm—Stevens, Davis, Miller & Mosher

[57] ABSTRACT

An apparatus for measuring contour configuration of articles, particularly brittle articles such as ceramic honeycombs without touching them comprising a turn table on which the article to be measured is placed, a rotary encoder mechanically coupled to the turn table for producing a rotational angle signal representing a rotational position of the article on the turn table, a lamp for illuminating the article on the table, particularly a portion of article to be measured such as an upper edge or side edge, a pick-up device including a lens for forming an optical image of said portion of article and an image detector such as a linear array of image sensor for converting the optical image into a picture signal, a memory for storing a standard picture signal which will be produced by the image detector when a standard article having given dimensions placed on the turn table is scanned during a single rotation thereof, and an operation circuit for receiving the rotational angle signal from the rotary encoder, the picture signal from the pick-up device and the standard picture signal from the memory and comparing these picture signals under the control of the rotational angle signal to produce a deviation of contour configuration of the portion of article from the standard article.

4 Claims, 3 Drawing Figures

APPARATUS FOR MEASURING CONTOUR CONFIGURATION OF ARTICLES

BACKGROUND OF THE INVENTION

The present invention relates to an apparatus for measuring automatically contour configuration of pillarshaped articles having a circular or elliptical cross section in a rapid and accurate manner without touching the articles.

Heretofore it has been known to measure the contour configuration of columnar articles such as cylindrical body, ellipitic pillar, and the like by urging the article against a limit gauge which has been formed with taking into consideration a tolerance of articles or by making contact a feeler with the article surface so as to measure its dimensions. In these known methods the limit gauge and the feeler is made directly contact with the articles. Therefore these methods could not be applied to brittle articles such as thin ceramic honeycombs.

SUMMARY OF THE INVENTION

The present invention has for its object to provide a novel and useful apparatus for measuring contour configuration or dimensions of articles in a rapid and accurate manner without touching the articles.

It is another object of the invention to provide an apparatus for measuring contour configuration of articles without touching them, which apparatus has a simple construction and is easily operated.

According to the invention an apparatus for measuring contour configuration of articles comprises: a turn table on which the article to be measured is placed; a detector for detecting a rotational angle of said turn table to produce a rotational angle signal; a light source for illuminating at least a portion of the article on the turn table, contour configuration of said portion being to be measured; a pick-up device including a lens for forming an optical image of said portion of article to be measured and an image detector for receiving said image to produce a video signal; a memory for storing a standard signal which corresponds to a standard article having given contour configuration; and an operation circuit for receiving said rotational angle signal, the video signal and the standard video signal and producing a signal which represents deviation in the contour configuration of the article to be measured from the standard article.

According to a preferred embodiment of the invention the apparatus further comprises optical means for measuring a distance between the article and the pick-up device and means for receiving said distance signal to drive the pick-up device in a direction of its optical axis in such a manner that the focussed image of the article is always formed on the image detector in the pick-up device.

DESCRIPTION OF THE PREFERRED EMBODIMENTS

Figure 1:
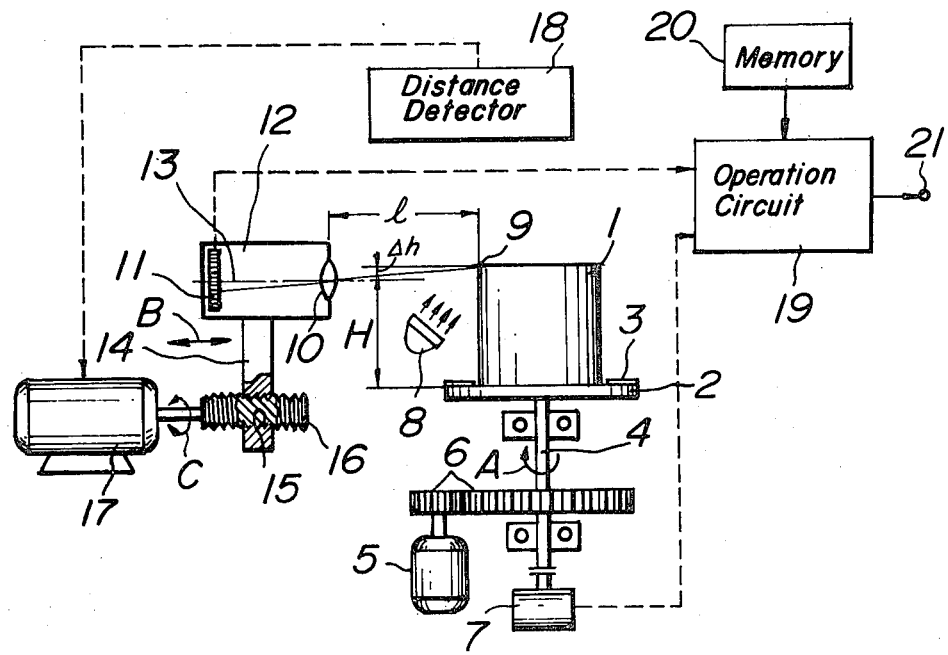
FIG. 1 is a schematic side view of an embodiment of an apparatus according to the invention.

FIG. 1 is a schematic view showing an embodiment of an apparatus for measuring contour configuration of articles according to the invention. An article 1 to be measured is placed on a turn table 2 at its center position. In order to ensure that the article 1 is placed on the table 2 at its center a suitable guide plate 3 is secured on the surface of turn table 2. The turn table 2 is connected to a rotating shaft 4 which is rotated in a direction shown by an arrow A by means of a motor 5 and gear mechanism 6. The rotating axis 4 is further connected to a rotational angle detector such as a rotary encoder 7. The rotary encoder 7 produces a rotational angle signal of the turn table 2 and thus the article 1. Besides the article 1 on the turn table 2 is arranged a light source such as a lamp 8 for illuminating a portion of the article 1 to be measured. In this embodiment a height of the article 1 is to be measured and thus an upper edge 9 of article 1 is illuminated by the lamp 8. An optical image of the edge portion 9 is projected by a lens 10 onto an image detector 11 both provided in a pick-up device 12. The pick-up device 12 is so arranged that when a standard article having given dimensions is placed on the turn table 2, an optical axis 13 of the lens 10, i.e. pick-up device 12 is made aligned with an upper edge of the standard article. That is to say a height H from the surface of turn table 2 to the optical axis 13 is made equal to a given height of the standard article. This arrangement is preferable, because in this case a measuring range can be made maximum. However it should be noted that according to the invention such an arrangement is not always necessary. The image detector 11 may be formed by, for example, a simple linear array of image sensor such as CCD or BBD linear array. Preferably, the direction of the array is that in which the contour configuration of the article is being measured. Alternatively the pick-up device 12 may be consisting of a television camera. The image detector 11 converts the optical image into a video signal which represents a position of the edge 9 of article 1 to be measured.

If the article 1 has an elliptic cross section, a distance l from the edge 9 of article 1 to the lens 10 of the pick-up device 12 varies in accordance with the rotation of the turn table 2 even if the article 1 is placed on the table 2 at its center. Therefore the optical image of the edge 9 formed by the lens 10 is not always focussed on the image detector 11 and thus a high accuracy of measurement could not be attained. In order to keep the distance l at a given length L, the pick-up device 12 is arranged movably in a direction shown by a double arrow B. The pick-up device 12 is connected to a rod 14 at a lower end of which is formed a tapped hole 15. A lead screw 16 is threaded through the tapped hole 15 and is connected at its one end to a reversible motor 17. In order to detect or measure the distance l between the edge 9 and the lens 10 an optical detection device 18 is provided. In FIG. 1 this device 18 is only schematically illustrated.

Figure 2:
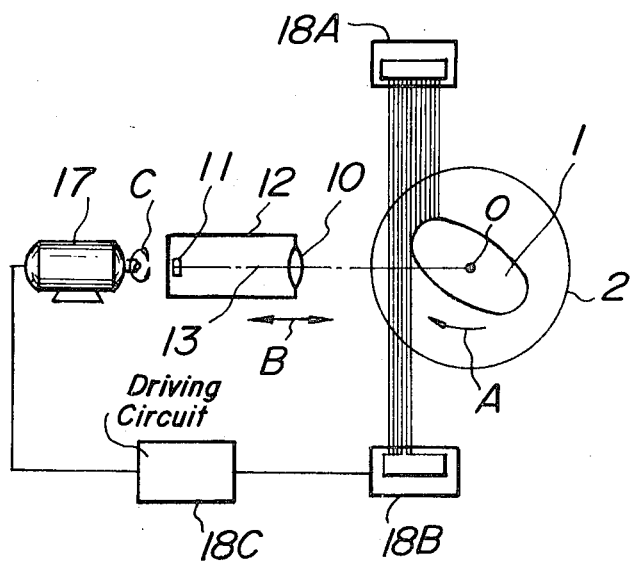
FIG. 2 is a schematic plan view of the apparatus shown in FIG. 1.

FIG. 2 is a plan view mainly showing the arrangement of the optical detection device 18 with respect to the article 1 on the turn table 2. The device 18 comprises a parallel light projecting member 18A including a laser light source and a rotating mirror for reflecting the laser beam in a parallel form as shown in FIG. 2, and a parallel light receiving member 18B for receiving the laser beam projected from the member 18A. These members 18A and 18B are arranged in a direction perpendicular to the optical axis 13 of the pick-up device 12. The parallel light projecting member 18A projects the laser light beam from, for instance, the left to the right in FIG. 2. During this scanning the laser beam is shielded by the article 1 and thus it is possible to measure a position of the edge 9 of article with respect to a standard point such as a center O of the turn table 2 by detecting a time during which the member 18B receives the laser beam in each scanning period of the rotary mirror installed in the member 18A. An output signal from the member 18B is supplied to a driving circuit 18C for supplying a driving signal to the reversible motor 17. Then the motor 17 and thus the lead screw 16 rotates in a given direction as shown by a double arrow C and the pick-up device 12 is moved in a given direction. During the rotation of the turn table 2 the driving circuit 18C supplies the driving signal to the motor 17 and the pick-up device 12 is moved in such a direction by such a distance that the distance l from the edge 9 of article 1 to the lens 10 is always keep to a given length and thus the optical image of the article edge 9 is always focussed on the image detector 11 in a correct manner.

The rotational angle signal from the rotary encoder 7 and the video signal from the image detector 11 are supplied to an operation circuit 19 to which is also supplied a standard video signal stored in a memory 20. The standard video signal corresponds to that which will be obtained from the image detector 11 when a standard article having given configuration and dimensions is placed on the turn table 2 and is rotated over an angle of 360°. In the operation circuit 19 these video signals are compared with each other under the control of the rotational angle signal supplied from the rotary encoder 7 and produces at an output 21 a signal which represents whether or not the measured article 1 has correct contour configuration, i.e. the correct height H.

Figure 3:
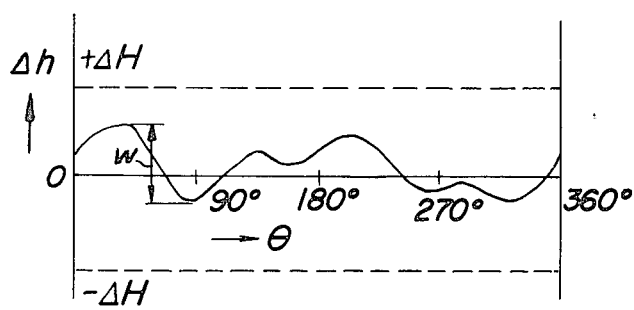
FIG. 3 is a graph for explaining the operation of the apparatus of FIGS. 1 and 2.

Now a measuring step for detecting the height of the article 1 with the aid of the apparatus shown in FIGS. 1 and 2 will be explained also with reference to FIG. 3. The article 1 of, for instance, a cylindrical body is placed on the turn table 2 and its upper edge 9 is illuminated. Then the optical image of the upper edge of article is formed on the image detector 11 of the pick-up device 12. Since the pick-up device 12 has been installed at such a level that its optical axis 13 corresponds to the desired height H if the height of the upper edge 9 of article 1 deviates from the desired value H by a distance $\Delta h$, the image on the detector 11 also deviates by an amount corresponding to the deviation $\Delta h$. This amount can be calculated as a product of a magnification of the lens 10 and the deviation $\Delta h$. In this manner a curve shown in FIG. 3 will be obtained while rotating the turn table 2 at a relatively low constant speed over an angle of 360°. In FIG. 3 the rotational angle $\theta$ is indicated on an abscissa and the amount of measured deviation $\Delta h$ from the standard height H on an ordinate. In the memory 20 there have been stored maximum acceptable tolerance values $+\Delta H$ and $-\Delta H$, and a maximum acceptable value W for a difference w between uppermost and lowermost values as well as the standard height value H. That is to say in the operaton circuit 19 the comparison is effected on the basis of the following two criteria;

(1) Whether or not the deviation exceeds the maximum tolerable values $\pm \Delta H$?

(2) Whether or not the peak-to-peak value w of the deviation $\Delta h$ exceeds the maximum tolerable value W?

When at least one of the above criteria is yes, the operation circuit 19 produces at the output 21 a signal which represents that the measured article 1 has impermissible error in contour configuration.

It should be noted that the present invention is not limited to the embodiment explained above, but many modifications can be conceived within the scope of the invention. For instance, various kinds of contour configuration of various shaped articles such as elliptic pillar, polygonal pillar may be measured by the apparatus according to the invention. Further the image of the article may be focussed on the image detector by means of various means. For example, if the article has a given cross section, the pick-up device 12 may be moved in a predetermined manner by a suitably shaped cam plate. Alternatively the lens 10 of pick-up device 12 may be moved by means of known autofocussing mechanism.

As explained above in detail the apparatus according to the invention can measure accurately the outer configuration, particularly the height of the article without touching the article and thus is very suitable for measuring brittle articles. Moreover since the measurement can be carried out in a very short time such as 2 to 3 seconds the measuring apparatus of the present invention is particularly applicable to articles such as ceramic honeycombs which are manufactured on a mass production scale.

What is claimed is:

1. An apparatus for measuring contour configuration of articles comprising;
    a turn table on which the article to be measured is placed;
    a detector for detecting a rotational angle of said turn table to produce a rotational angle signal;
    a light source for illuminating at least a portion of the article on the turn table, the contour configuration of said portion being to be measured;
    a pick-up device including a lens for forming an optical image of said portion of article to be measured and an image detector for receiving said image to produce a video signal;
    a memory for storing a standard signal which corresponds to a standard article having given contour configuration;
    an operation circuit for receiving said rotational angle signal, the video signal and the standard video signal and producing a signal which represents deviation in the contour configuration of the article to be measured from the standard article;
    means for detecting a distance l between the portion of article to be measured and the pick-up device; and
    means for driving the pick-up device in a direction of its optical axis in accordance with the detected distance in such a manner that the optical image of article is always focused on the image detector in the pick-up device, wherein an edge of the article is illuminated by said light source and an optical axis of said pick-up device is aligned on a corresponding edge of the standard article whereby said operation circuit detects a deviation of height of article from a standard height and a deviation of the contour dimension of article to be measured from the standard value.

2. An apparatus for measuring contour configuration of articles comprising;
    a turn table on which the article to be measured is placed;

a detector for detecting a rotational angle of said turn table to produce a rotational angle signal;

a light source for illuminating at least a portion of the article on the turn table, the contour configuration of said portion being to be measured;

a pick-up device including a lens for forming an optical image of said portion of article to be measured and an image detector for receiving said image to produce a video signal;

a memory for storing a standard signal which corresponds to a standard article having given contour configuration, and the maximum permissible tolerance of said deviation;

an operation circuit for receiving said rotational angle signal from said detector, the video signal from said pick-up device and the standard video signal from said memory and producing a signal which represents deviation in the contour configuration of the article to be measured from the standard article;

means for detecting a distance l between the portion of article to be measured and the pick-up device;

means for driving the pick-up device in a direction of its optical axis in accordance with the detected distance in such a manner that the optical image of article is always focused on the image detector in the pick-up device, wherein an edge of the article is illuminated by said light source and an optical axis of said pick-up device is aligned on a corresponding edge of the standard article whereby said operation circuit measures deviation of the height of the article from a standard height and deviation of the contour dimensions of the article to be measured from the standard value, and said operation circuit compares said measured deviation with said maximum permissible tolerance and measures a peak-to-peak value of the deviation and compares the measured peak-to-peak value with the maximum permissible value stored in the memory.

3. An apparatus for measuring contour configuration of articles comprising;

a turn table on which the article to be measured is placed;

a detector for detecting a rotational angle of said turn table to produce a rotational angle signal;

a light source for illuminating at least a portion of the article on the turn table, the contour configuration of said portion being to be measured;

a pick-up device including a lens for forming an optical image of said portion of article to be measured and an image detector for receiving said image to produce a video signal;

a memory for storing a standard signal which corresponds to a standard article having given contour configuration; and an operation circuit for receiving said rotational angle signal, the video signal and the standard video signal and producing a signal which represents deviation in the contour configuration of the article to be measured from the standard article, wherein said image detector in the pick-up device includes a linear array of image sensors and the linear array of image sensors is aligned in a direction, in which the contour configuration of article is to be measured and an edge of the article is illuminated by said light source and an optical axis of said pickup device is aligned on a corresponding edge of the standard article so as to measure a deviation of height of article from a standard height and said operation circuit detects a deviation of the contour dimension of article to be measured from the standard value.

4. An apparatus for measuring contour configuration of articles comprising;

a turn table on which the article to be measured is placed;

a detector for detecting a rotational angle of said turn table to produce a rotational angle signal;

a light source for illuminating at least a portion of the article on the turn table, the contour configuration of said portion to be measured;

a pick-up device including a lens for forming an optical image of said portion of article to be measured and an image detector for receiving said image to produce a video signal;

a memory for storing a standard signal which corresponds to a standard article having given contour configuration, wherein said memory further stores the maximum permissible tolerance of said deviation;

an operation circuit for receiving said rotational angle signal, the video signal and the standard video signal and producing a signal which represents deviation in the contour configuration of the article to be measured from the standard article;

means for detecting a distance l between the portion of article to be measured and the pick-up device;

means for driving the pick-up device in a direction of its optical axis in accordance with the detected distance in such a manner that the optical image of article is always focused on the image detector in the pick-up device, wherein said image detector in the pick-up device includes a linear array of image sensors and the linear array of image sensors is aligned in a direction so as to measure the contour configuration of article and an edge of the article is illuminated by said light source and an optical axis of said pick-up device is aligned on a corresponding edge of the standard article whereby said operation circuit detects a deviation of the height of the article from a standard height and a deviation of the contour dimension of the article to be measured from the standard value and the operation circuit compares the detected deviation with maximum permissible tolerance.

* * * * *